US012254568B2

(12) United States Patent
Baker et al.

(10) Patent No.: US 12,254,568 B2
(45) Date of Patent: Mar. 18, 2025

(54) SYSTEM AND METHOD FOR COLLECTING AND GEOREFERENCING 3D GEOMETRIC DATA ASSOCIATED WITH A GPS-DENIED ENVIRONMENT

(71) Applicant: Mine Vision Systems, Inc., Pittsburgh, PA (US)

(72) Inventors: L. Douglas Baker, Pittsburgh, PA (US); Christopher J. Brown, Acme, PA (US); Matthew A. Csencsits, Pittsburgh, PA (US); Scott M. Thayer, Pittsburgh, PA (US)

(73) Assignee: Mine Vision Systems, Inc., Pittsburgh, PA (US)

( * ) Notice: Subject to any disclaimer, the term of this patent is extended or adjusted under 35 U.S.C. 154(b) by 156 days.

(21) Appl. No.: 17/653,866

(22) Filed: Mar. 7, 2022

(65) Prior Publication Data
US 2022/0284671 A1 Sep. 8, 2022

Related U.S. Application Data

(60) Provisional application No. 63/158,035, filed on Mar. 8, 2021.

(51) Int. Cl.
*G06T 17/05* (2011.01)
*G01C 15/00* (2006.01)
*G01V 8/02* (2006.01)

(52) U.S. Cl.
CPC ............ *G06T 17/05* (2013.01); *G01C 15/002* (2013.01); *G01V 8/02* (2013.01)

(58) Field of Classification Search
None
See application file for complete search history.

(56) References Cited

U.S. PATENT DOCUMENTS 9,986,176 B2 * 5/2018 Moghadam ............ H04N 13/25
2009/0096807 A1 4/2009 Silverstein et al.
(Continued)

OTHER PUBLICATIONS

International Search Report and Written Opinion for International PCT Application No. PCT/US2022/071011, dated Jun. 2, 2022.

*Primary Examiner* — Yingchun He
(74) *Attorney, Agent, or Firm* — K&L Gates LLP

(57) ABSTRACT

A system for georeferencing three-dimensional (3D) geometric data associated with a global positioning system (GPS)-denied environment. The system includes an apparatus couplable to a mobile platform and a computing system communicably couplable with the apparatus. The apparatus includes a processing circuit and a range sensor and/or a camera. The computing system includes a 3D generator module configured to generate a digital 3D model of the GPS-denied environment based on data acquired by the range sensor and/or the camera, a 3D survey control generator module configured to identify a survey control point within the GPS-denied environment and generate a 3D digital anchor within the 3D model of the GPS-denied environment, a georeferencing module configured to apply one or more non-rigid transformations to the 3D model of the GPS-denied environment, and a second processing circuit communicably couplable with the 3D generator module, the 3D survey control generator module and the georeferencing module.

26 Claims, 16 Drawing Sheets

(56) References Cited

U.S. PATENT DOCUMENTS

| | | | |
|---|---|---|---|
| 2013/0096873 A1* | 4/2013 | Rosengaus | G01C 15/002 |
| | | | 702/155 |
| 2014/0225985 A1* | 8/2014 | Klusza | H04N 13/271 |
| | | | 348/46 |
| 2016/0110913 A1 | 4/2016 | Kosoy et al. | |
| 2019/0107642 A1 | 4/2019 | Farhadi Nia et al. | |
| 2020/0175708 A1 | 6/2020 | Baker et al. | |

\* cited by examiner

SYSTEM AND METHOD FOR COLLECTING AND GEOREFERENCING 3D GEOMETRIC DATA ASSOCIATED WITH A GPS-DENIED ENVIRONMENT

CROSS-REFERENCE TO RELATED APPLICATIONS

This application claims the benefit under 35 U.S.C. § 119(e) of the earlier filing date of U.S. Provisional Patent Application No. 63/158,035 filed on Mar. 8, 2021, titled SYSTEM AND METHOD FOR GEOREFERENCING 3D GEOMETRIC DATA ASSOCIATED WITH A GPS-DENIED ENVIRONMENT, the contents of which are hereby incorporated by reference in their entirety.

BACKGROUND

This application discloses an invention which is related, generally and in various aspects, to a system and method for collecting and georeferencing three-dimensional (3D) geometric data associated with a global positioning system (GPS)-denied environment. More particularly, this application discloses a system and method for generating a georeferenced 3D geometry of a location associated with a GPS-denied environment.

In the context of mining, geologic mapping is used to provide many types of essential information during exploration for new mineral deposits and during subsequent mining of minerals. For example, a geologic map may be used to describe the primary morphology and lithology of rock bodies and establish the geometric delineation of valuable, ore-bearing host rock and waste, or gangue mineral, bearing rock that can truncate or obscure valuable ores. Geologic maps can also have many additional uses other than identifying contained geology. Such uses may include, for example, identifying and analyzing areas for facilities, infrastructure, equipment planning, water resources, geological hazards, change detection, geotechnical information, implicit modeling based on identified objects or bodies, or on projections of identified objects or bodies, etc.

Geometric delineations of types of geology can be used in conjunction with additional geologic data, such as geochemical data, to produce zonations for target ore or areas of sought-after types of mineralization. Typically, these geometric delineations and zonations are made at the active mining "face", the location where the mining tunnel within the orebody comes to an end but can additionally identify geology on any surface within the mine.

Current geologic mapping systems do not provide a method to expediently collect 3D geometric data representing a mine, identify salient geometric data, and identify survey control points for placing the data in its real-world coordinate location. Methods used to work around these deficits often require extensive amounts of time, and subsequently money, to ultimately provide less than adequate infrastructure for geologic mapping. These issues are particularly true for systems utilized in GPS-denied environments (e.g., subterranean structures such as, for example, a mine, a tunnel, a cave, a bunker, a conduit, etc.) as existing systems have been primarily developed for use where GPS data is easily accessible.

A GPS-denied environment is any location where a person or system does not have access to any of the Global Navigation Satellite Systems (GNSS) which provide the backbone for GPS systems. There are a number of GNSS systems including GPS, QZSS, BEIDOU, GALILEO, and GLONASS. Each of these satellite constellations ultimately provide systems to compute a coordinate location on the earth's surface. A clear line of sight is required to maintain a communicative connection to the satellite systems and compute the coordinate locations. GPS-denied environments are most commonly areas with an obstructed line of sight such as, for example, in buildings, under bridges, or in subterranean/underground areas such as mining environments. Without a connection to one of the GNSS systems, traditional, manual survey methods are typically utilized to measure coordinate locations. These manually measured coordinate locations can be used for comparison to other known coordinate locations but require additional time to make measurements for coordinate computation.

FIG. 1 illustrates a representation of an area of a mine containing geometric delineation and zonation of ore bearing material and waste material. In FIG. 1, the area is representative of a mining face, the shaded area represents an identifiable geologic body (i.e., the ore bearing material) and the white areas represent a different identifiable geologic body (i.e., the waste material). The geometric delineations and zonations can be used in mine planning decisions to maximize revenue by reducing risk associated with geologic uncertainty introduced in the pre-mining phase of mineral exploration.

The face shown in FIG. 1 may be considered the first face. As mining progresses, whether it be through drilling and blasting, a continuous miner, or another mining method, a face other than the first face will exist at a point later in time and differ in spatial location relative to the first face. The second face and any subsequent faces are also recorded with geometric delineations and zonations for ore bearing material and waste material. The individual geologic face recordings, composed of geometric delineations and zonations, can be utilized in conjunction with one another to form an overall geologic map and illustrate the complete 3D orebody as mining progresses.

In GPS-denied environments such as a mine, survey control data provides 3D coordinate points representing horizontal and vertical position information. For applications associated with mining environments, it is common to provide the horizontal and vertical position in a 3D Cartesian coordinate system to allow for spatial information to be referenced in relation to the coordinate system axes, where, as an example, at the origin the Y-axis remains perpendicular to the X-axis to form the XY plane that can be used to denote horizontal position, and the Z-axis remains perpendicular to the XY plane to denote vertical position. In practice, the coordinate system can be oriented to best suit the environment.

The 3D Cartesian coordinate system generally utilized in mining is simply known as a coordinate system, one where all subsequent survey control points are relative to, and measured from, a previously known survey control point. For the mapping process, the measuring of positions in series is known as surveying a "traverse," that is often represented as a line with the survey control point positions denoted on the line. Often, the initial survey control point can be identified on the surface outside of a mine by simple GPS-based survey methods. From the known, GPS-identified survey control point on the surface, non-GPS-based survey techniques are utilized to measure angles and distances to the next control point within the mine, where GPS becomes unavailable. With each set of measurements, the coordinate position can be computed and assigned to the survey control point.

The delineations and zonations are additionally mapped in relation to survey control data to spatially locate the salient geologic mapping information within a real-world coordinate system (e.g., a geographic coordinate system—a coordinate system associated with positions on Earth), a process also known as georeferencing. When used in conjunction with survey control data, geologic mapping data can be associated with locations commonly known to those utilizing the data, often within spatially complex mining environments, or to reference the data to the known position of other real-world locations. Currently, this process is one of the most time-consuming portions of geologic mapping work due to the manual requirements of taking many measurements and manually placing the data in electronic/digital formats.

Geologic mapping is particularly important in the mining process as it underpins the construction of 3D geologic and orebody models. 3D models improve mineral exploration and mine planning through interpolation and extrapolation of known geologic mapping data. Digital geologic mapping solutions have been primarily developed to support geologic mapping on the earth's surface where GPS data is easily accessible for georeferencing collected data and do not fully support complexities often encountered in mining.

FIG. 2 illustrates a representation of a two-dimensional (2D) geology of a mine realized through a paper and pencil-based mapping. In FIG. 2, the shaded areas represent an identifiable geologic body (i.e., the ore bearing material) and the white areas represent a different identifiable geologic body (i.e., the waste material). Paper and pencil-based mapping is a known method for geologic mapping in GPS-denied environments such as mines. A 2D geometric sketch delineating morphology and lithology is created for each face created during the mining process, and may be annotated with associated geochemical information. A 2D plan view, or top-down view, of the mining area is made where each face can be plotted in association with measured survey control points in the area. Similar lithologies can be connected via lines between the respective faces. The basic steps of the paper and pencil-based mapping process may be repeated, adding new faces, survey control points and lines as mining progresses.

Another known practice in digital geologic mapping combines 2D imaging, 2D delineation and zonation, and survey control data in 3D space. An imaging device such as a camera is used to capture a 2D image of the face where it can be digitally, manually annotated with 2D geometric shapes delineating and zonating present geology. A 3D wireframe of the mining area is generated from multiple survey traverses made by connecting a number of survey control points. Traverse lines are made to simply represent the left wall, right wall, floor and roof of the mining tunnel to generate the wireframe. In more advanced methodologies the 3D wireframe can be replaced with 3D mine plan data that generates a 3D mine model made of 2D surfaces. The 2D images can then roughly be placed within the 3D mine representation by adjusting the position down the length of the mine tunnel in reference to the survey control points or by directly assigning a survey position to the image.

Utilizing this known practice in digital geologic mapping additionally requires measurements to be taken to each face from a known survey coordinate location. The 2D images are placed at the measured distances from known survey control points within the digital wireframe. The measurements to each face are often done without survey equipment to save time, making the measurements less accurate and prone to systematic errors.

FIG. 3 illustrates a placement of a 2D image with 2D geometric delineations and zonations of identifiable geologic bodies in a simple 3D representation of a mine tunnel. In FIG. 3, the darker areas of the 2D image represent an identifiable geologic body (i.e., the ore bearing material), the lighter areas of the 2D image represent a different identifiable geologic body (i.e., the waste material), and the simple 3D representation of the mine tunnel includes survey traverses, where each survey traverse is georeferenced utilizing the survey control points.

Current digitized geologic mapping solutions often require extensive amounts of time to capture images, manually delineate and annotate the images, and most importantly, take manual measurements to place the images in their geospatial position. The mine tunnel representations described above provide over simplified or idealized geometric shapes representing what is planned and do not reflect the true 3D geometric shape of the mine tunnel or mine face that can provide more in-depth detail for salient data extraction.

U.S. Pat. No. 8,857,915 to Nieto et al., titled "Scanning System for 3D Mineralogy Modelling", describes a method of mining by utilizing a vehicle fitted with a scanning module to scan a mine bench for both geometric and geologic information, making ore grade assessment of material at the bench from information provided by the bench scan, removing material from the bench; and transporting the removed material for processing. At least one of said removing, transporting, and processing is performed at least partially dependent on the ore grade assessments. The scanning module and/or the vehicle are fitted with a GPS receiver for positioning of the collected geometric information and is thus not possible to use in GPS-denied environments.

U.S. Pat. No. 10,706,603 to Yeon et al., titled "Apparatus for Editing Geological Elements Using Touch-Based Interface", describes an apparatus to retrieve geologic information of a survey area, thereby mapping and displaying geometric elements of point, lines, and areas. The apparatus allows the user to edit the points, lines, and areas, but not collect the geologic or survey information.

U.S. Pat. No. 10,204,454 to Goldman et al., titled "Method and System for Image Georegistration", describes a method to acquire a 2D sensor image that is compared to a 2D model image of the area that is generated from a 3D geographic model. The sensor image and model image are compared to generate positional discrepancies. The discrepancies are used to update the 3D position and orientation of the 2D image or to determine the geographic location coordinates.

U.S. Pat. No. 20,200,285,831 to Slatcher, et al., titled "Three-Dimensional Dataset and Two-Dimensional Image Localisation", describes a computer system and method for receiving 3D mapping data in which a plurality of the locations within the 3D mapping data are associated with 3D camera timing information and 2D image data that is associated with 2D camera timing information. The 2D images are given a location within the 3D map based on corresponding timing information.

BRIEF DESCRIPTION OF THE DRAWINGS

The novel features of aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
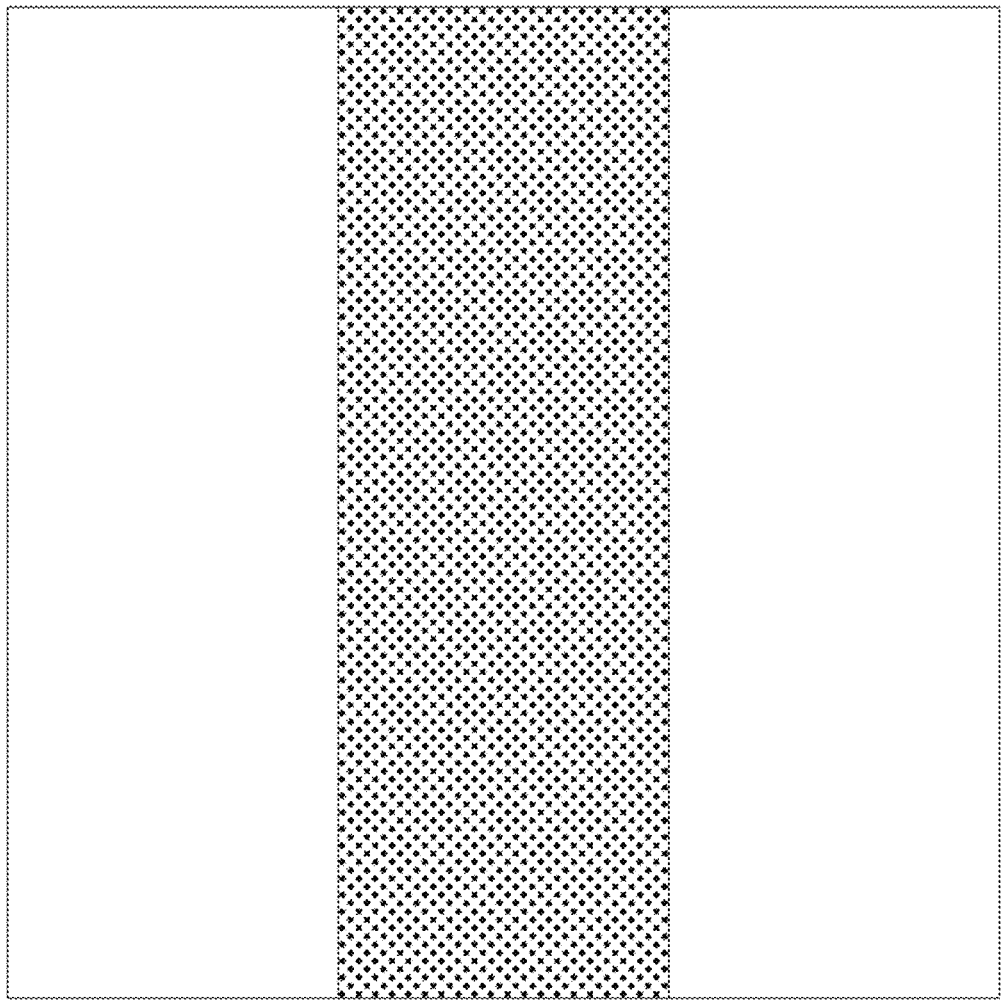
FIG. 1 illustrates a representation of an area of a mine containing geometric delineation and zonation of ore bearing material and waste material.
Figure 2:
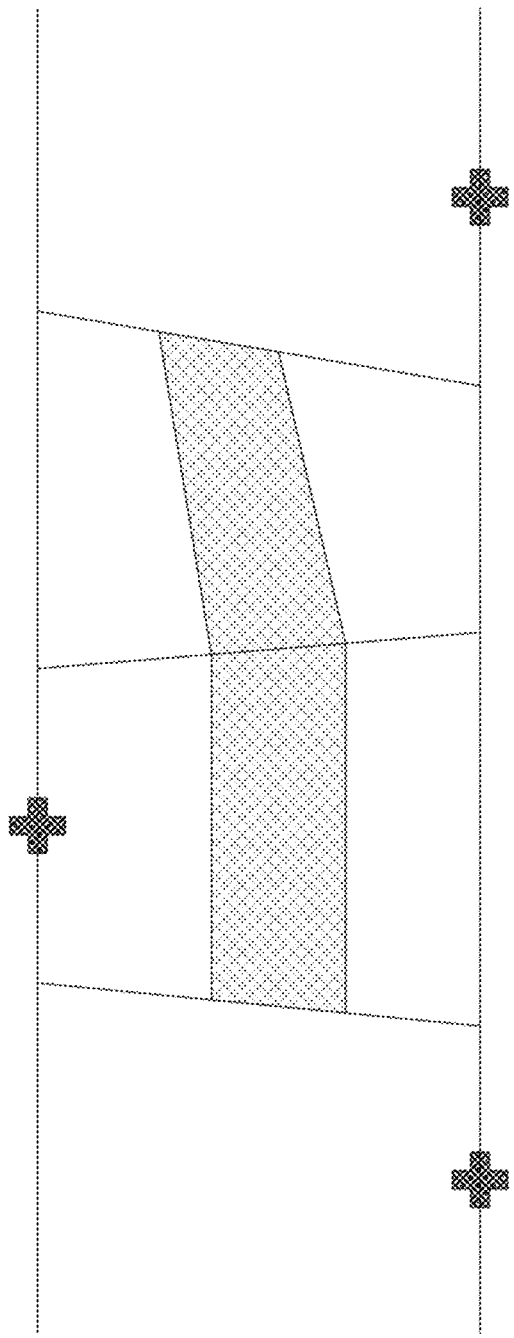
FIG. 2 illustrates a representation of a two-dimensional (2D) geology of a mine realized through a paper and pencil-based mapping.
Figure 3:
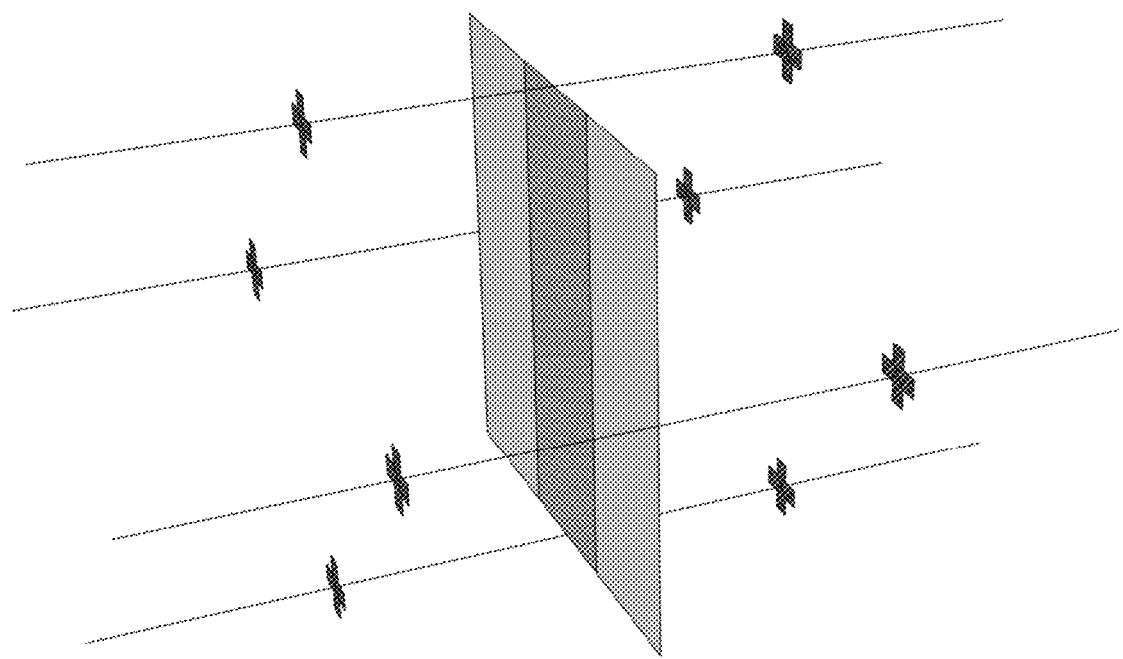
FIG. 3 illustrates a placement of a 2D image with 2D geometric delineations and zonations of identifiable geologic bodies in a simple 3D representation of a mine tunnel.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description reference is made to the accompanying drawings. In the drawings, similar symbols and reference characters typically identify similar components throughout several views, unless context dictates otherwise. The illustrative aspects described in the detailed description, drawings, and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the system and method, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the system and method disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Aspects of the described invention may be implemented by a computing device and/or a computer program/software/ algorithm stored on a computer-readable medium. The computer-readable medium may comprise a disk, a device, and/or a propagated signal.

Figure 4:
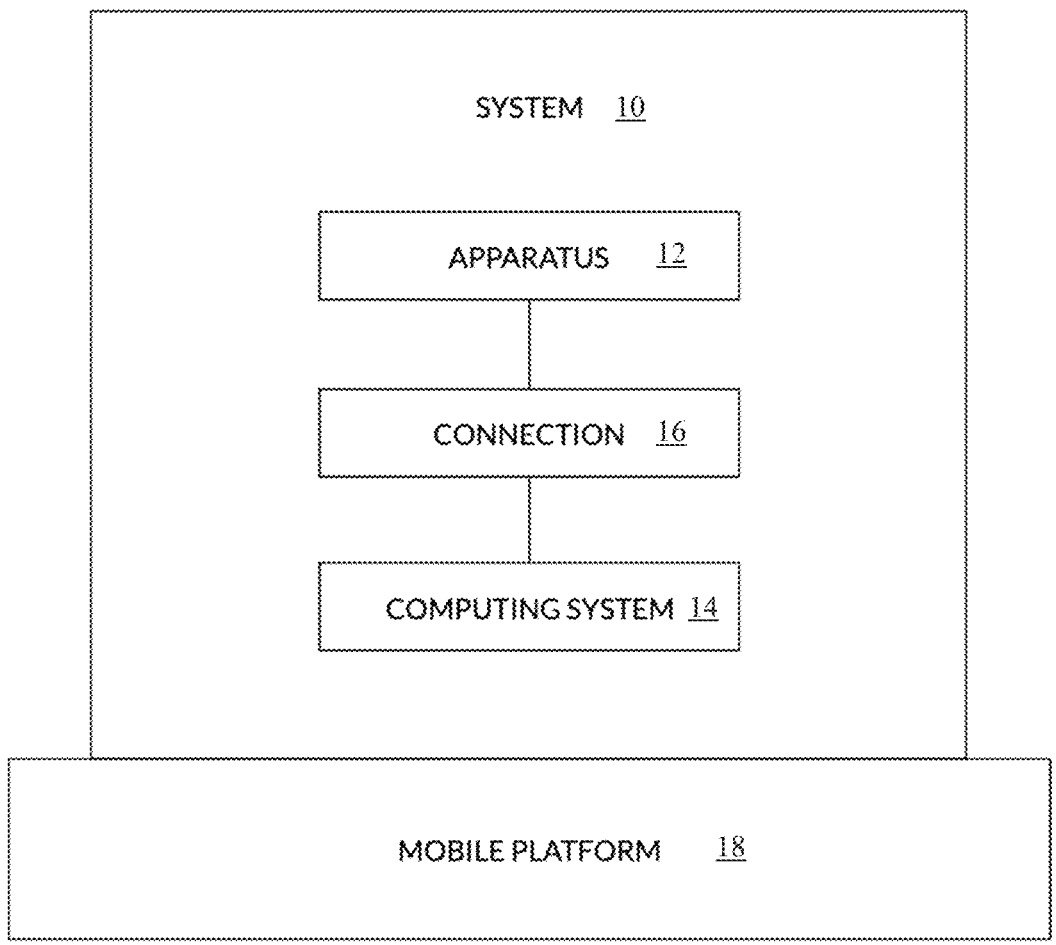
FIG. 4 illustrates a system for collecting and georeferencing 3D geometric data associated with a GPS-denied environment, in accordance with at least one aspect of the present disclosure.

FIG. 4 illustrates a system 10 for collecting and georeferencing 3D geometric data associated with a GPS-denied environment, in accordance with at least one aspect of the present disclosure. In various applications, the system 10 may be utilized to generate a georeferenced 3D geometry of a location associated with a GPS-denied environment such as a subterranean structure. The 3D geometry may be described as a 3D electronic/digital representation of all, portions of, or specific locations in the GPS-denied environment. The 3D geometry may be utilized for the purpose of improving processes such as geologic mapping, which is further used as a basis for 3D orebody modelling and mine planning. Although the subterranean structure can be any type of subterranean structure (e.g., a mine, a tunnel, a cave, a bunker, a conduit, etc.), for purposes of simplicity, the 3D geometric data and the GPS-denied environment will be described hereinafter in the context of a mine.

The system 10 may be utilized to expediently collect and, with automated processing, identify salient geometric information regarding the mine and its contained geology as well as identify survey control points for placing the data in its real-world coordinate system (e.g., a geographic coordinate system) in GPS-denied environments. The results allow for a quick and accurate basis for ore body modeling and viewing and inspecting the 3D geometric data in its real-world coordinate system (e.g., a geographic coordinate system) for spatial relation to other known locations that may be important, such as the locations of structures on the surface that may be affected by underground excavations.

The system 10 includes an apparatus 12 communicably coupled to a computing system 14 via a connection 16. In general, the apparatus 12 is structured and arranged to communicate with the computing system 14 via the connection 16. The apparatus 12 and computing system 14 may be mounted to, attached to, and/or carried by a mobile platform 18. The mobile platform 18 can be a human, an autonomous robot, a vehicle driven by a human, a drone operated by a human, etc. According to various aspects, the system 10 may also include the mobile platform 18. The apparatus 12 is described in further detail hereinbelow with respect to FIG. 5.

The computing system 14 device may consist of one or more computing devices which can be any type of computing device such as, for example, a server, a desktop, a laptop, etc. that includes one or more processors. For aspects where the computing system 14 includes more than one computing device, the respective computing devices may be communicably coupled to one another. The computing system 14 is described in further detail hereinbelow with respect to FIGS. 6 and 7.

The connection 16 supporting communication between the apparatus 12 and the computing system 14 may be composed of any type of delivery system including physical connections such as twisted pair cables, coaxial cables, fiber optic cables, etc. or wireless network connections such as local area networks, wide area networks, radio networks, satellite networks, etc. and/or any other wired or wireless communication network.

Figure 5:
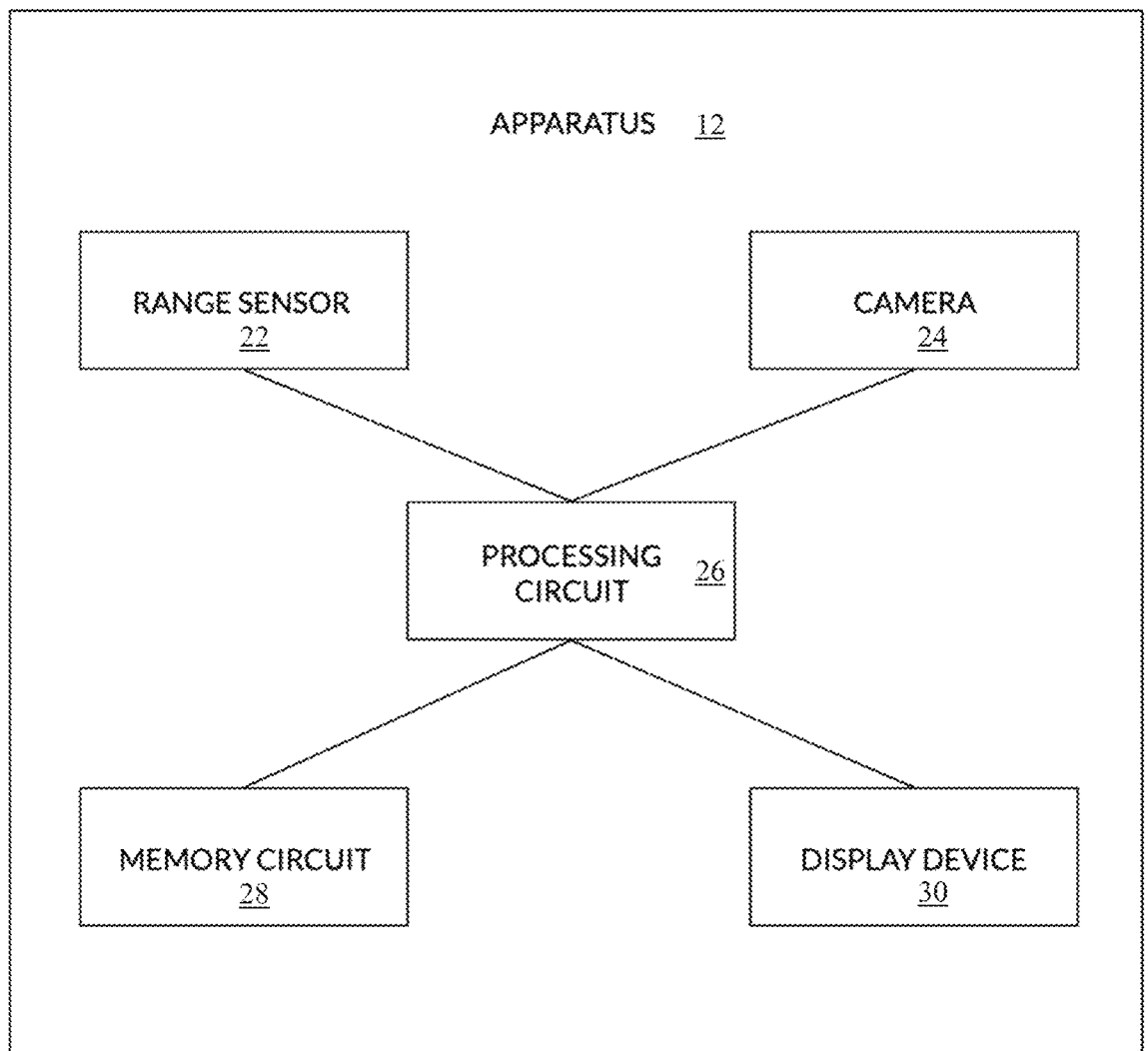
FIG. 5 illustrates the apparatus of the system of FIG. 4, in accordance with at least one aspect of the present disclosure.

FIG. 5 illustrates the apparatus 12, in accordance with at least one aspect of the present disclosure. The apparatus 12 includes a range sensor 22 and/or a camera 24, a processing circuit 26 communicably coupled to the range sensor 22 and/or the camera 24, a memory circuit 28 communicably coupled to the processing circuit 26, and a display device 30 communicably coupled to the processing circuit 26. Although FIG. 5 only illustrates one range sensor 22, one camera 24, one processing circuit 26, one memory circuit 28 and one display device 30, it will be appreciated that the apparatus 12 may include any number of these components. For purposes of simplicity, it will also be understood that the computing system 14 is incorporated into the apparatus.

The range sensor 22 may include a laser rangefinder such as a light detection and ranging (LiDAR) module, a radar module, an ultrasonic ranging module, a sonar module, a ranging module using triangulation, or any other device able to acquire data representative of the geometry of the mine. For aspects where the range sensor 22 includes a laser rangefinder, the range sensor 22 emits a physical signal and receives a reflected physical signal which is a reflection of the emitted physical signal. The emitted and reflected signals can be, for example, light beams, electromagnetic waves, acoustic waves, etc. By scanning the mine in a two-dimensional plane X, Y (where X is a first direction and Y is a second direction, which is not collinear with X, and the directions X and Y form coordinate axes) while rotating around a third direction, Z, which is perpendicular to the first and second directions, the range sensor 22 can acquire data which is representative of the three-dimensional geometry of the mine. Examples of types of 3D scans which can be secured by the range sensor 22 include point clouds, wireframes, spatially registered image sequences (either absolute or relative registration), and/or textured meshes. The memory circuit 28 can store the acquired data, the processing circuit 26 can process the acquired data, and the display device 30 can be utilized to view a representation of the acquired data.

For aspects which include more than one range sensor 22, each range sensor 22 may include a unique range sensor identification which can be stored in the memory circuit 28 along with distance and/or angle measurements associated with the given range sensor 22.

The camera 24 operates to capture images of various parts of the interior of the mine. Each camera 24 may be any suitable type of camera. The camera 24 may include a single camera with a single lens configured to capture a 2D image of the interior of the mine. In other variations, the camera 24 may include multiple cameras to capture 2D images or 3D images of the interior of the mine from different positions/angles/orientations, allowing the captured images to be subsequently utilized in reconstruction of the mine geometry. Image data from the camera 24 can be stored on the memory circuit 28.

The processing circuit 26 is configured to process the acquired range sensor data and/or the camera data. According to various aspects, the processing circuit 26 is configured to calculate, for a plurality of different points of the mine, both a distance from the range sensor 22 to the different points and respective angles (relative to a reference) between the range sensor 22 and the different points based on the orientation of the range sensor 22 and data indicative of the emitted and reflected signals (e.g., the time of emission of the emitted signal and the time of reception of the reflected signal). According to various aspects, the processing circuit 26 is also configured to time stamp the acquired range sensor data and/or the camera data. The processing circuit 26 is further configured to utilize the time stamps to time-synchronize the acquired range sensor data and/or camera data and to utilize the acquired range sensor data and/or the camera data to generate an electronic/digital 3D representation of the mine. Along with each time stamp, the processing circuit 26 is also configured to record the position (X, Y, Z coordinate location) and orientation (roll, pitch, yaw), also known as odometry, of the range sensor 22 and/or the camera 24.

The processing circuit 26 may be, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The processing circuit 26 may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, the processing circuit 26 may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 28 is coupled to the processing circuit 26 and may include more than one type of memory. For example, according to various aspects, the memory circuit 28 may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DRRAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 28 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

According to various aspects, the apparatus 12 is configured to estimate the motion of the range sensors 22 and/or the cameras 24 in the 3D environment, also known as ego-motion, by analyzing the data captured by the range sensors 22 and/or the cameras 24. This analysis can further accurize the acquired data by making dynamic adjustments to the range sensor and/or the camera during data capture, eliminating false results in the acquired 3D geometric data.

As described hereinabove, both the apparatus 12 and the computing system 14 may be mounted to, attached to, and/or carried by the mobile platform 18. As the mobile platform 18 travels about the mining environment, the range sensor 22 and/or the camera 24 can acquire data representative of the mine. The acquired data can be considered "mobile" data and can be stored in the memory circuit 28.

Figure 6:
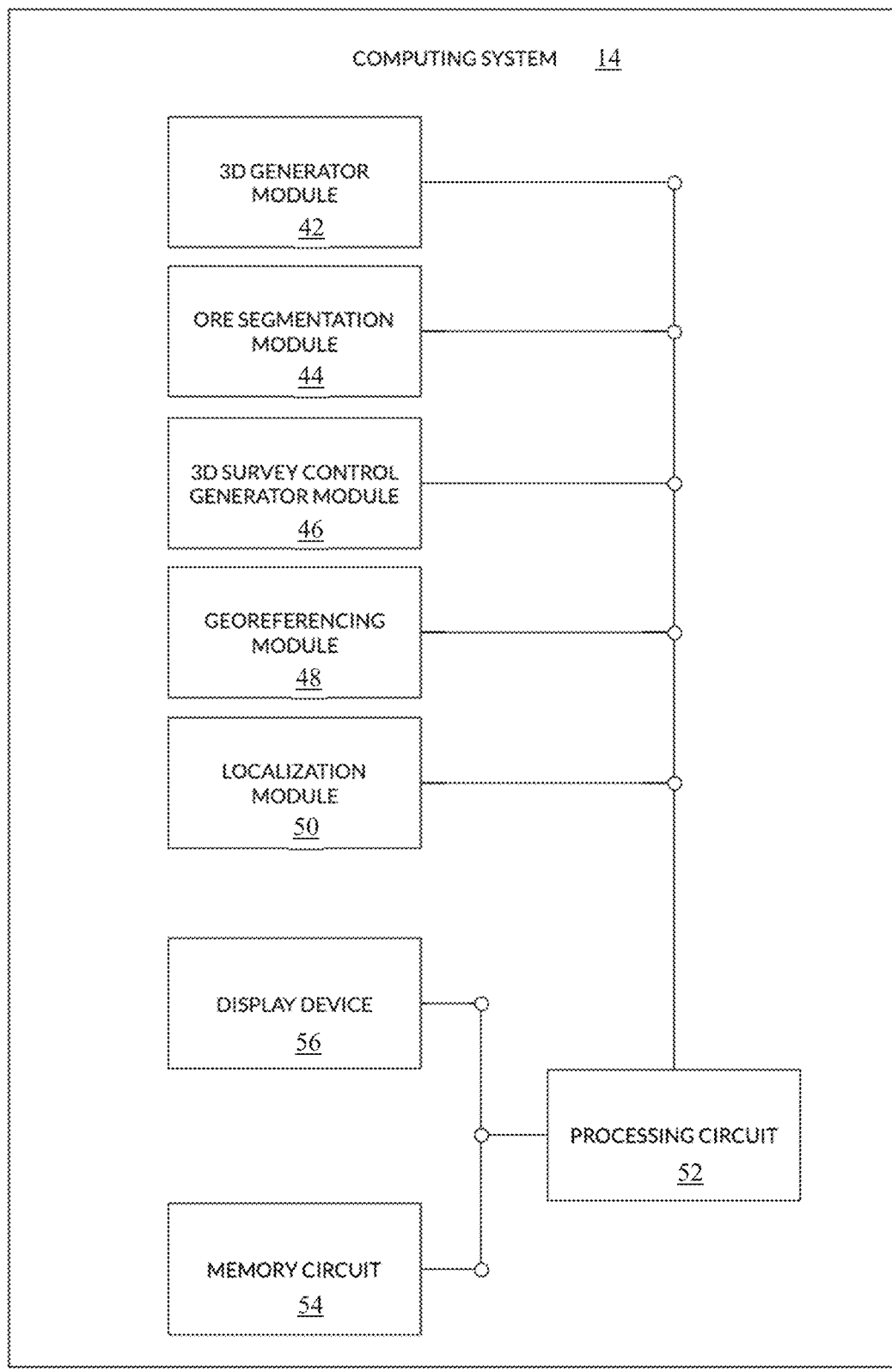
FIG. 6 illustrates the computing system of the system of FIG. 4, in accordance with at least one aspect of the present disclosure.

FIG. 6 illustrates the computing system 14, in accordance with at least one aspect of the present disclosure. The computing system 14 may include a 3D generator module 42, an ore segmentation module 44, a 3D survey control generator module 46, a georeferencing module 48, a localization module 50, a processing circuit 52, a memory circuit 54 and a display device 56. Although only one processing circuit 52, one memory circuit 54 and one display device 56 is shown in FIG. 6, it will be appreciated that the computing system 14 may include any number of these components. The processing circuit 52 may be similar or identical to the processing circuit 26, the memory circuit 54 may be similar or identical to the memory circuit 28, and the display device 56 may be similar or identical to the display device 30.

The 3D generator module 42 is configured to utilize the acquired range sensor data and/or the acquired camera data (e.g., 2D images) to generate an electronic/digital 3D model of the mine. The electronic/digital 3D model of the mine can be generated in real-time, in near real-time, or at some point after the acquisition of the range sensor data and/or camera data. For each time the apparatus 12 passes through the mine, or a portion thereof, and acquires data with the range sensor 22 and/or the camera 24, the 3D generator module 42 can generate an electronic/digital 3D model of the mine based on the acquired range sensor data and/or camera data. The electronic/digital 3D models of the mine can be visually presented by the display device 30.

The 3D generator module 42 is also configured to generate a set of calibrations which are utilized to spatially locate captured images within the electronic/digital 3D model of the mine. A first calibration rectifies acquired images from the camera 24 and straightens any physically straight lines that are optically distorted during the image acquisition process. The rectified image allows a relationship to be made between 3D space and its projection onto an image plane resulting in a X, Y, Z position in 3D space relative to the location of the camera 24 (i.e. on the image plane) that can be computed based on a 2D image. A second calibration provides a spatial relationship between the range sensor 22 and the camera 24. The spatial calibration reconciles the spatial difference in origin position between the range sensor 22 and the camera 24. Utilizing the range sensor/camera calibrations, positions/shapes in the image plane can be projected onto the correct spatial position within the 3D data utilizing the time stamping and recorded odometry data from the range sensor 22. From the rectified 2D images projected properly within the electronic/digital 3D model of the mine, a X, Y, Z position can be calculated from the camera image and translated to the electronic/digital 3D model of the mine.

The computation of a X, Y, Z position from a 2D camera image that is translated in a position on the electronic/digital 3D model of the mine can be used to compute the position of a single X, Y, Z coordinate location or any number of X, Y, Z coordinate locations that may be used in combination to represent an area of the mine. It will be appreciated that the quality of the digital 3D model of the mine may be enhanced by utilizing additional sensors/devices/techniques such as, for example, inertial measurement units, precision time source and synchronization, physical odometry, etc.

The ore segmentation module 44 is configured to process the 2D images (which can include identifiable geology) captured by the camera 24. The ore segmentation module 44 operates to first define a region of interest within the 2D image to process. The region of interest may be established manually, through automated fixed methods, such as applying the same boundaries on every image captured, or through automated dynamic methods, such as determining the face or area containing the identifiable geology by identifying a plane perpendicular to the axis of the camera lens. In some instances, no region of interest may be established, and the entire 2D image can be processed by the ore segmentation module 44.

The ore segmentation module 44 is configured to automatically process the region(s) of interest in the 2D images to identify geology for delineation and zonation. The ore segmentation module 44 may identify the geology based on color, shape, or a combination of the two. For example, according to various aspects, geology to be identified in images is given a value, or values within a threshold, for identification based on the best color space for identifying the sought-after geology. Common color space models that are utilized are the RGB (red, green, blue) color model, CMYK (cyan, magenta, yellow, black) color model, and the HSV (hue, saturation, value) color model, although these are not meant to be limiting in the application of the disclosed art. It should be appreciated that combinations of color spaces can be utilized to further aid in identification of geology. For a given set of values, or threshold of values, the ore segmentation module 44 can convert the acquired image into the color space model best used for geology identification and generate a delineated zonation, or area, of identified geology within the 2D image. The delineations and zonations in the 2D image can then be used in calculating corresponding X, Y, Z positions in the 3D geometric data as previously described. Although the capture and analysis described above is in the context of the visible light spectrum, it will be appreciated that sensors associated with devices such as, for example, multispectral imagers, hyperspectral imagers, x-ray imagers, gamma ray imagers, infrared imagers, radio wave imagers, microwave imagers and the like may be utilized to capture the 2D images in non-visible regions of the light spectrum.

In cases of structural geology, where, primarily, physical, 3D structures of rock or other material are used to identify stress and strain fields existing in the geologic formations, further methods can be employed by the ore segmentation module 44 for geology identification. For example, pattern recognition of color data seen in the 2D images, or pattern recognition of 3D structural patterns identifiable in the corresponding 3D model of the mine, can be implemented to further improve identification capabilities of the ore segmentation module 44 to identify geology or geologic structures based on color, shape and/or a combination of color and shape. It will be appreciated that identifying patterns or objects based purely on geometry or structural patterns can be used in instances where color data alone may not be sufficient, available or useful.

The ore segmentation module 44 is further configured to generate 3D geometric representations (delineations and zonations) of the identified geologies where conventionally used geologic mapping solutions provide 2D representations of these areas. Electronic/digital, 3D representation of areas can be generated by forming textured meshes of the processed image or region of interest. These textured meshes can be colorized based on the color space values generated during the ore segmentation module processing to further actualize the 3D representation of the areas. The ore segmentation module 44 additionally is configured to generate 3D delineations, or 3D polygons, surrounding the identified geology. The ore segmentation module 44 may generate as many polygons as necessary to identify all geology contained within an ore segmentation module processed image. The textured meshes and 3D polygons can be shown on the display device 56 and used as an improved foundation, in comparison to their 2D counterparts, for orebody modeling utilized in the mining industry and can be generated in real-time, in near real-time, or at some point after the acquisition of the range sensor date and/or camera data.

The 3D survey control generator module 46 is configured to process the 2D images (which can include identifiable survey control points) captured by the camera 24. The survey control points captured within the 2D images may be made up of any type of identifiable mark or marks. For example, according to various aspects, such identifiable marks may be a painted mark, a drawn mark, a sticker, etc., or a physical body such as, for example, a survey spad, a bolt, or the like. Similar to the X, Y, Z coordinate points and areas identified in the 3D data in the ore segmentation module 44, the 3D survey control generator module 46 is configured to identify a survey control point within a 2D image captured by the camera 24 and calculate a position for the identified survey control point within an image and generate a 3D electronic/digital anchor at the survey control point X, Y, Z coordinate location in the 3D model of the mine. According to various aspects, the identification of the survey control point within a 2D image may be done automatically (e.g., automated computing detection). According to other aspects, the identification of the survey control point within a 2D image may be done manually (e.g., human designation). The 3D survey control generator module 46 may identify one or more survey control points within an image and generate corresponding 3D electronic/digital anchors. The 3D electronic/digital anchors can be placed within the 3D model of the mine and shown on the display device 56. The 3D electronic/digital anchors can be generated in real-time, in near real-time, or at some point after the acquisition of the range sensor data and/or camera data. An example of a generated 3D electronic/digital anchor can be found in U.S. Pat. No. 10,580,156, the content of which is hereby incorporated by reference.

The survey control point X, Y, Z coordinate locations measured by surveyors and surveying equipment for each survey control point are uploaded to the memory circuit 54. After generation of a 3D electronic/digital anchor associated with a survey control point, the 3D survey control generator module 46 is utilized to match the 3D electronic/digital anchor to its corresponding 3D survey control point coordinates creating an electronic/digital connection between the two.

The georeferencing module 48 is configured to spatially relocate the electronic/digital 3D model of the mine from an arbitrary coordinate system to a real-world coordinate system of the mine. The real-world coordinate system of the mine may be, for example, a geographic coordinate system, or any other suitable coordinate system. The georeferencing module is configured to spatially relocate the 3D model of the mine by moving the 3D electronic/digital anchors to the surveyed (measured) coordinate locations associated with the survey control points. When 3D electronic/digital anchors are matched to their corresponding survey control point coordinates, the 3D electronic/digital anchors are used by the georeferencing module 48 to spatially relocate the electronic/digital 3D model of the mine, and associated range data, image data and geometric representation data to their positions in the real-world coordinate system of the mine. This process can reduce inaccuracy in the 3D model of the mine as computed solely from collected sensor data. This process thus allows any electronic/digital inspection, measurements, orebody model basis, etc. to have a direct measurement in the real world. Georeferencing can be completed in real-time, in near real-time, or at some point after the acquisition of the range sensor data and/or camera data.

According to various aspects, the georeferencing module 48 further reduces various kinds of error that can be introduced during the processing of range sensor data and camera data for electronic/digital 3D mine model generation. Errors may present as a linear or angular deviation over time or distance from the true location of the electronic/digital measurements captured by the apparatus 12 and processed by the computing system 14 to generate the electronic/digital 3D model of the mine. As the electronic/digital 3D model of the mine is updated with new data collections or during one long data collection, errors may accumulate causing one end to deviate from its true spatial position. As electronic/digital anchors are generated by the 3D survey control generator module 46 at measured survey control point locations, the errors can be reduced by matching the electronic/digital anchors to the corresponding survey control point coordinates. In practice, this process can colloquially be understood as applying one or more non-rigid transformations to an electronic/digital 3D model that contains errors to realize its correct real-world location based on the electronic/digital anchors and the measured survey control point coordinates. The application of such non-rigid transformations may operate to bend, twist, shrink, etc. the electronic 3D model of the mine to the collected survey control data.

The localization module 50 is configured to update 3D geometric data as mining continues. Stated differently, the localization module 50 is configured to position additional range sensor data and image data as such data is acquired. The localization module 50 is configured to utilize a previous electronic/digital 3D model of the mine to align a subsequent electronic/digital 3D model of the mine (generated based on additional range sensor data and image data acquired subsequent to the generation of the previous electronic/digital 3D model of the mine) to the previous electronic/digital 3D model of the mine. The alignment of the subsequent electronic/digital 3D model of the mine places it in the same coordinate system as the previous electronic/digital 3D model of the mine and can happen in real-time, in near real-time, or at some point after the acquisition of subsequent range sensor data and/or camera data. This allows a given electronic/digital 3D model of the mine to be updated with subsequent range sensor data and camera data, and processing outputs of this data as mining progresses.

In contrast to existing geologic mapping methods that provide 2D geologic mapping delineations and zonations, the system 10 allows expedient collection and automated processing of range sensor data and camera data for salient 3D geometric information regarding the mine and its contained geology. Due to the automated nature of the processing, the system 10 may be used to collect a much greater volume of geologic data and to more accurately identify "hidden" geology by utilizing various color spaces and/or shapes to improve the geologic model and subsequent mine planning.

It will be appreciated that the improved identification of geology represented by 3D geometries will also be placed into the mine coordinate system with use of the georeferencing module 48, making data use and comparison to existing data or real-world comparisons require no additional, manual spatial translation as seen in existing systems. The 3D survey control generator 46 provides an improvement over current systems in that it can identify any type of marker through an image versus existing methods to georeference 3D data sets, which require installation of extra otherwise unnecessary 3D survey objects within the environment to be subsequently identified within the 3D data, or require the collected 3D data to be subsequently post-processed outside of the field to manually align the collected 3D data to previously taken survey control point data.

The modules 42-50 may be implemented in hardware, firmware, software and in any combination thereof. Software aspects may utilize any suitable computer language (e.g., C, C++, Java, JavaScript, Python, etc.) and may be embodied permanently or temporarily in any type of machine, component, physical or virtual equipment, storage medium, or propagated signal capable of delivering instructions to a device. The modules 42-50 may be stored on a computer-readable medium (e.g., disk, device, and/or propagated signal) such that when a computer reads the medium, the functions described herein are performed. The above-described functionality of the modules 42-50 may be combined into fewer modules, distributed differently amongst the modules, spread over additional modules, etc.

Figure 7:
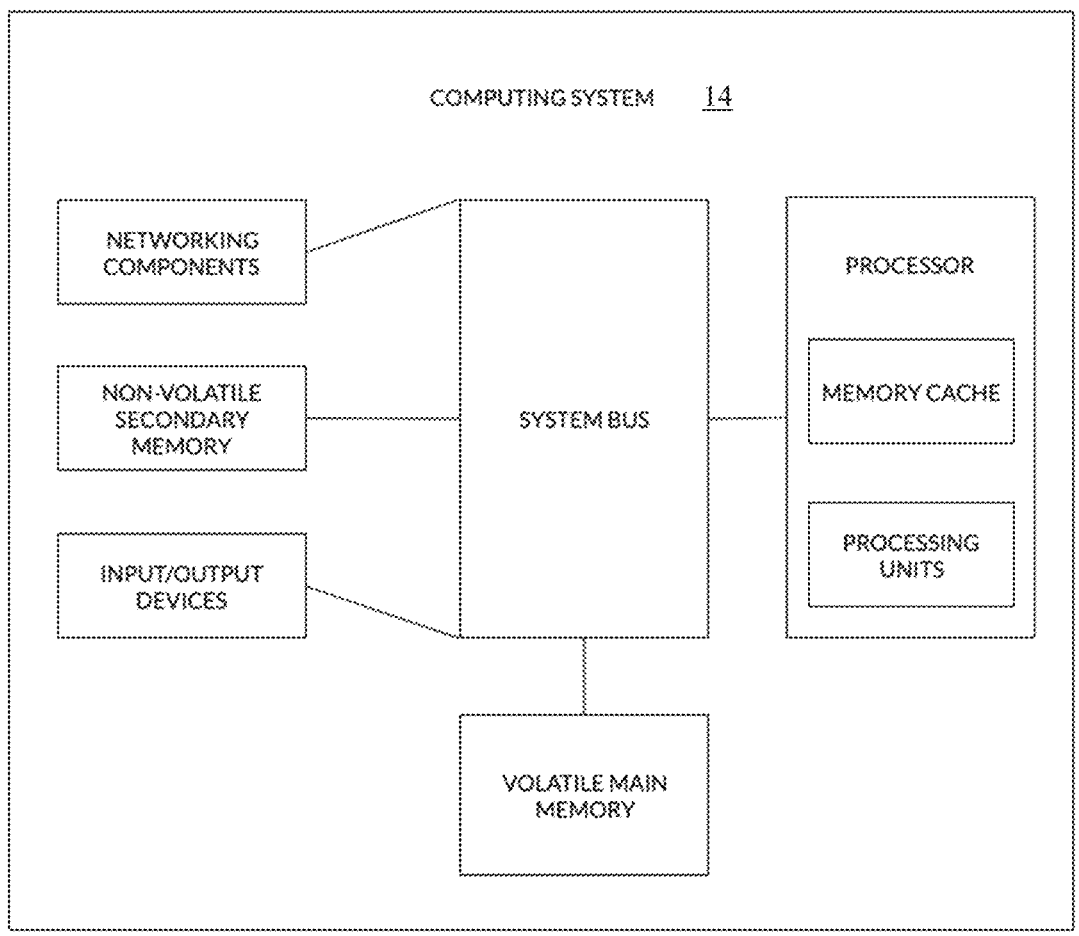
FIG. 7 illustrates additional components of the computing system of the system of FIG. 4, in accordance with at least one aspect of the present disclosure.

FIG. 7 illustrates additional components of the computing system 14, in accordance with at least one other aspect of the present disclosure. The computing system 14 may be embodied as one or more computing devices and includes networking components such as ethernet adapters or wireless network adapters, non-volatile secondary memory such as magnetic disks, input/output devices such as keyboards and displays, volatile main memory, and one or more processors. Each of these components may be communicably connected via a common system bus. The processor includes processing units and on-chip storage devices such as memory caches. Although only one processor is shown in FIG. 7, it will be appreciated that the computing system may include any number of processors.

The computing system 14 includes one or more modules which are implemented in software, and the software is stored in non-volatile memory devices while not in use. When the software is needed, the software is loaded into volatile main memory. After the software is loaded into volatile main memory, the processor reads software instructions from volatile main memory and performs useful operations by executing sequences of the software instructions on data which is read into the processor from volatile main memory. Upon completion of the useful operations, the processor writes certain data results to volatile main memory.

Figure 8:
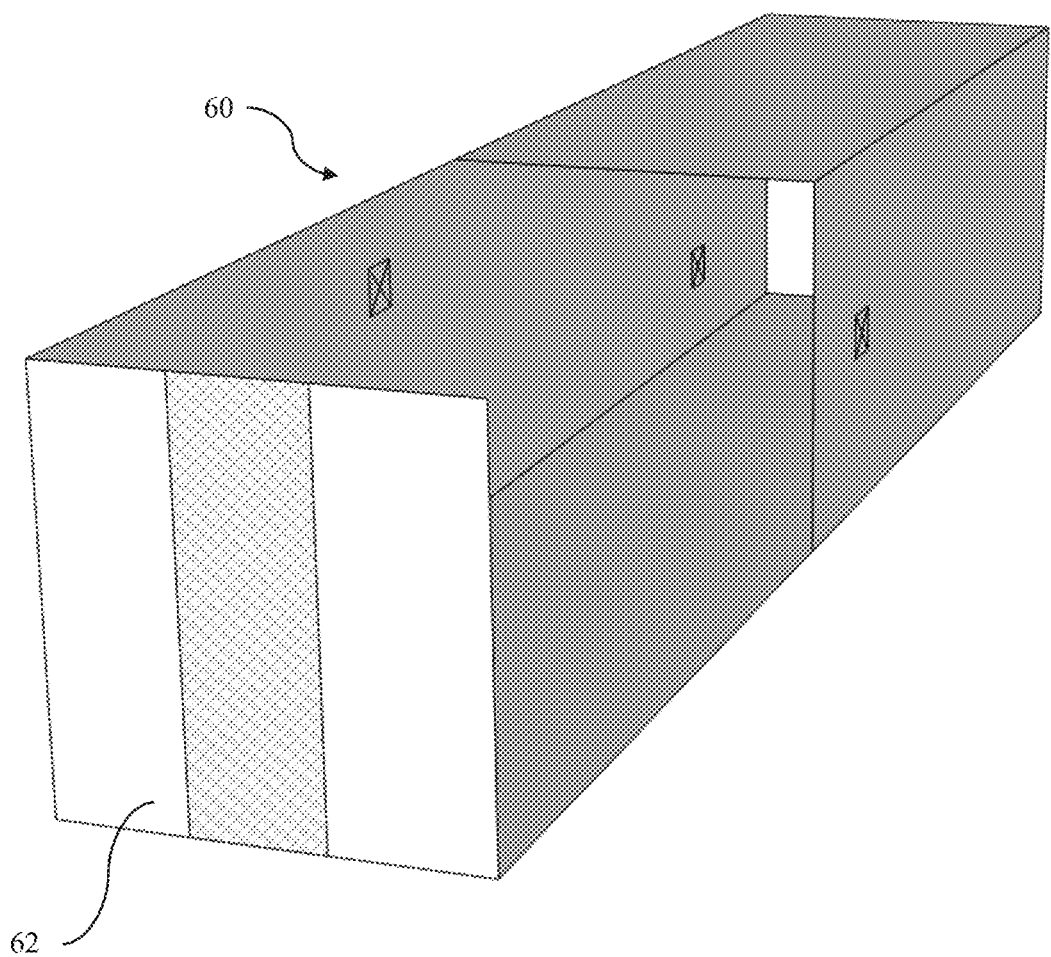
FIG. 8 illustrates a 3D representation of a mining environment.

FIG. 8 illustrates a 3D representation 60 of a mining environment. The 3D representation 60 of the mining environment has been cut away to view a face 62 and three contained survey control points (each of the survey control points are represented by a "boxed X"). The face 62 exists at the current "end" of the mining environment and contains some identifiable geology (i.e., the shaded portion of the face 62). The three survey control points are marked on the sidewalls of the mine. The system 10 is used to acquire range sensor data and camera data associated with the mining environment to generate an electronic/digital 3D model of the mine.

Figure 9A:
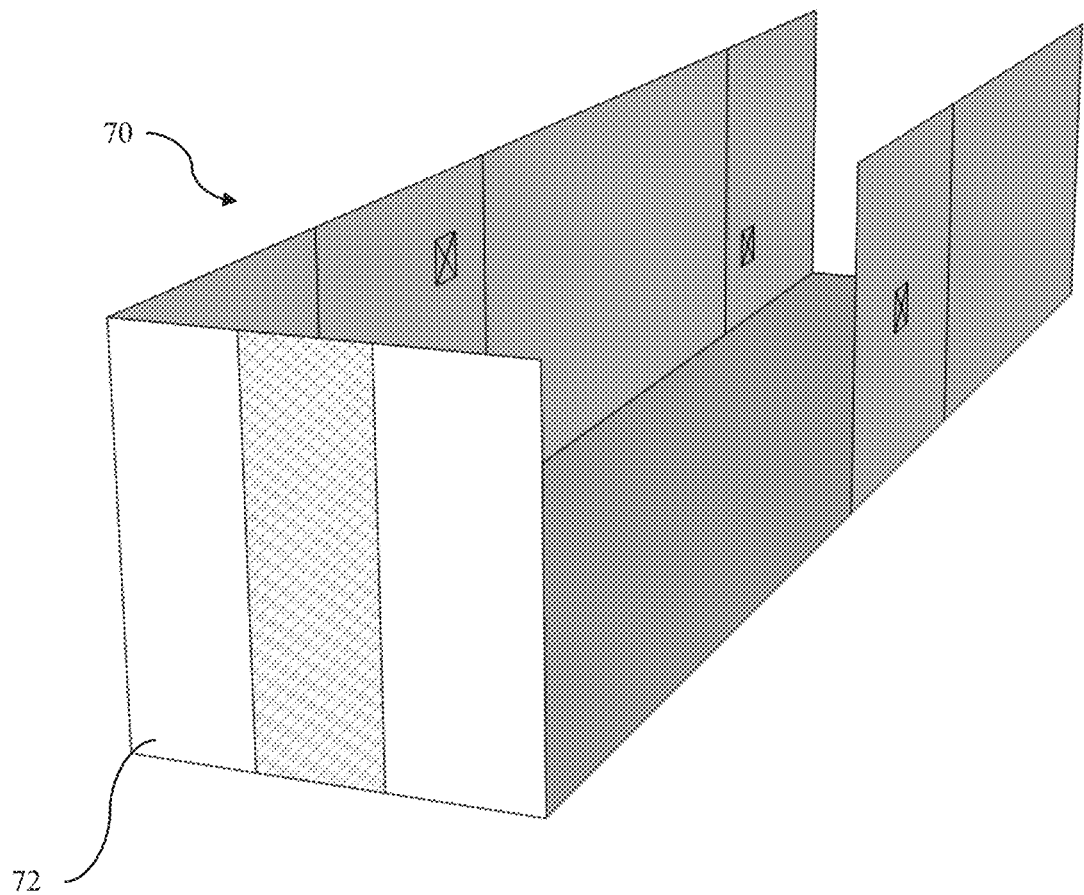
FIG. 9A illustrates an electronic/digital 3D mine model generated by the 3D generator module of the computing system of FIG. 6, in accordance with at least one aspect of the present disclosure.

FIG. 9A illustrates an electronic/digital 3D mine model 70 generated by the 3D generator module 42, in accordance with at least one aspect of the present disclosure. The electronic/digital 3D mine model 70 includes a face 72 which shows identifiable geology (i.e., the shaded portion of the face 72) and three survey control points (each of the survey control points are represented by a "boxed X").

Figure 9B:
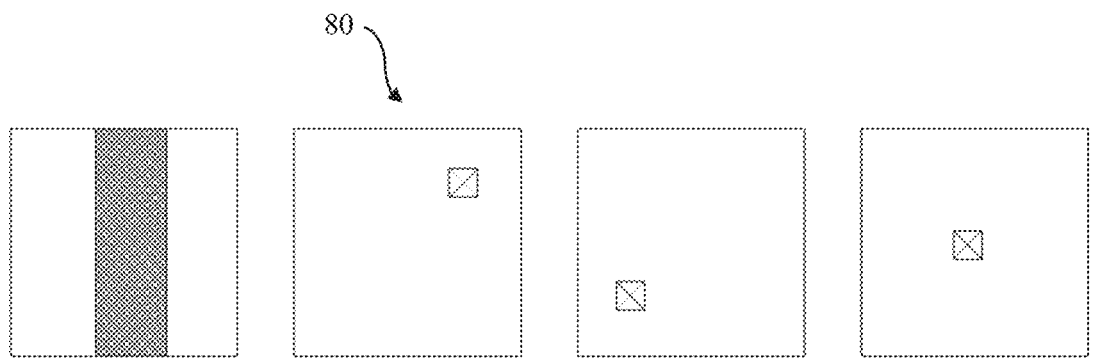
FIG. 9B illustrates representations of spatially located 2D images of the electronic/digital 3D mine model of FIG. 9A.

FIG. 9B illustrates representations of spatially located 2D images 80 of the electronic/digital 3D mine model 70 of FIG. 9A. The above described calibrations are utilized by the 3D generator module 42 to spatially locate the 2D images of the face 72 and the survey control points within the electronic/digital 3D mine model 70 generated by the 3D generator module 42. The 2D images are also utilized by the ore segmentation module 44 and the 3D survey control generator module 46 to process the 2D images and generate their 3D counterparts.

Figure 10:
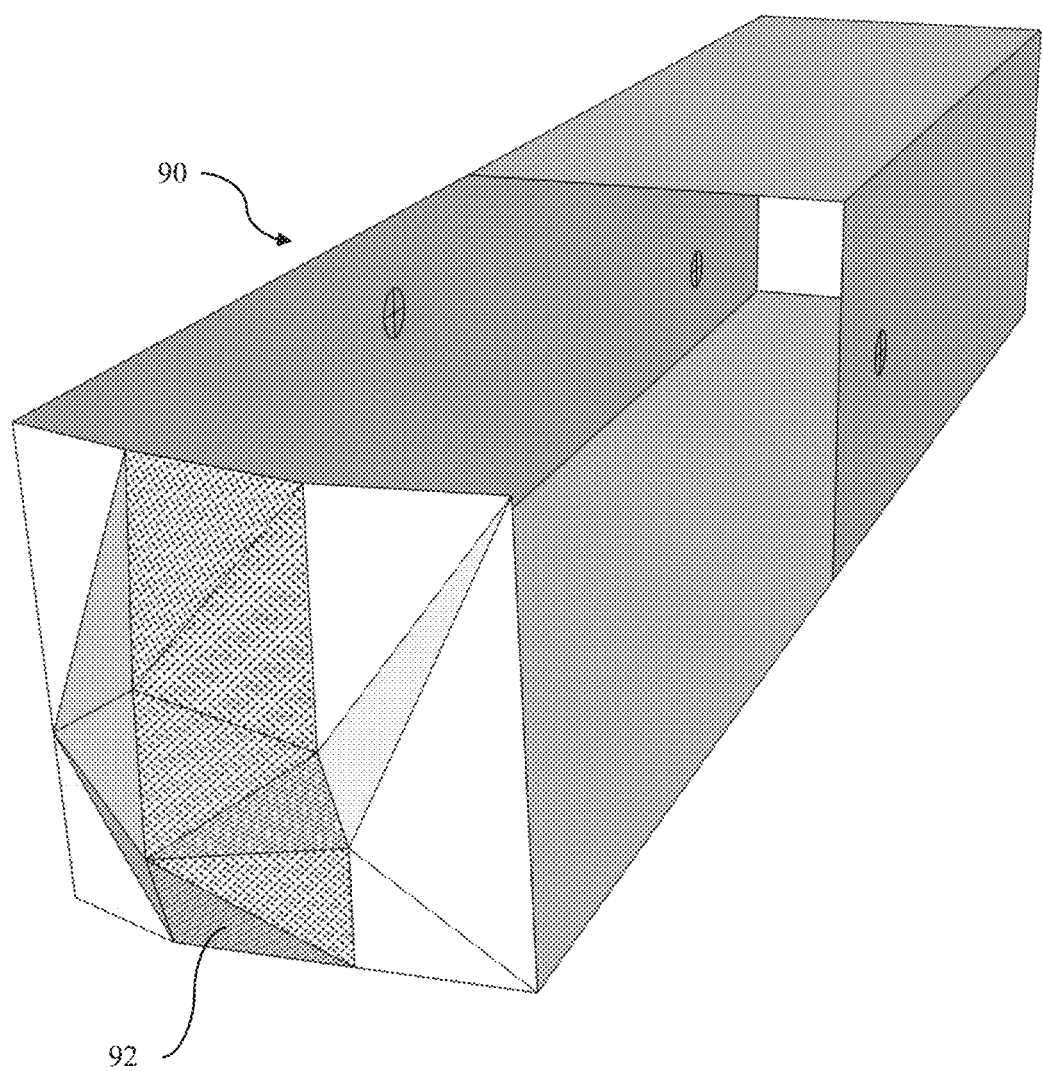
FIG. 10 illustrates an electronic/digital 3D mine model generated by the system 10, in accordance with at least one aspect of the present disclosure.

FIG. 10 illustrates an electronic/digital 3D mine model 90 generated by the system 10, in accordance with at least one aspect of the present disclosure. The electronic/digital 3D mine model 90 includes a face 92 and three 3D electronic/digital anchors (each of the 3D electronic/digital anchors are represented by a "circle with a crosshair". The system 10 overlays the output of the ore segmentation module 44 (e.g., a 3D textured mesh of the face 72 containing delineations and zonation of the ore bearing geology) and the output of the 3D survey control generator module 46 (e.g., three 3D electronic/digital anchors) into the electronic/digital 3D mine model 70 of FIG. 9A to generate the electronic/digital 3D mine model 90 of FIG. 10. It is important to note that the 3D electronic/digital anchors of FIG. 10 are differentiated from the survey control points of FIG. 9A in 3D space by being represented by a circle with a crosshair versus a boxed X. The differentiation is important to note because it is the 3D electronic/digital anchors, not the survey control points or markers in 3D space, that are used for georeferencing, although both exist at the same spatial location.

Figure 11A:
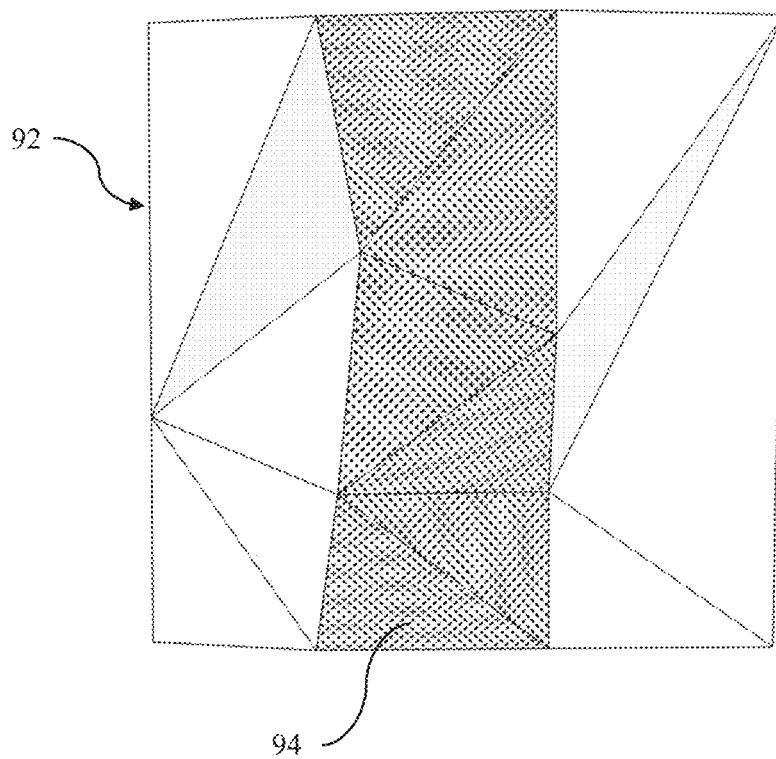
FIG. 11A illustrates a front view of a face of the electronic/digital 3D mine model of FIG. 10, in accordance with at least one aspect of the present disclosure.
Figure 11B:
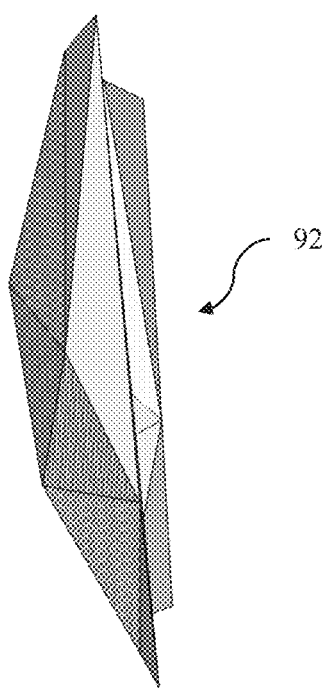
FIG. 11B illustrates a side view of the face of the electronic/digital 3D mine model of FIG. 10, in accordance with at least one aspect of the present disclosure.

FIG. 11A illustrates a front view of the face 92 of the electronic/digital 3D mine model 90 of FIG. 10, in accordance with at least one aspect of the present disclosure. The face 92, which is a 3D representation, includes 3D delineations and zonations 94 (in the form of a 3D polygon) of the ore bearing geology. FIG. 11B illustrates a side view of the face 92 of FIG. 11A, in accordance with at least one aspect of the present disclosure. In comparison to the current 2D image methodology, the 3D textured mesh of the face 92 gives insight to the geometry of the geology at the face 92 in relation to the actual geometric representation of the mining environment versus a mine plan that consists of perfect surfaces.

Figure 12A:
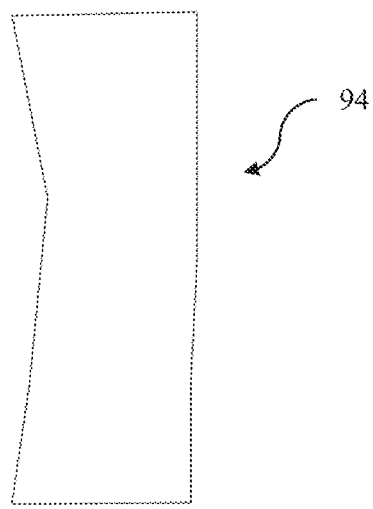
FIG. 12A illustrates a front view of a 3D polygon of FIG. 11B, in accordance with at least one aspect of the present disclosure.
Figure 12B:
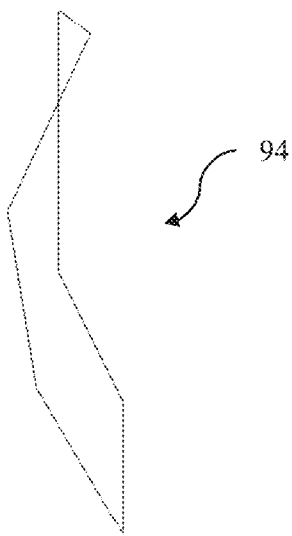
FIG. 12B illustrates a side view of the 3D polygon of FIG. 11B, in accordance with at least one aspect of the present disclosure.

FIG. 12A illustrates a front view of the 3D polygon 94 of the face 92 of FIG. 11B, in accordance with at least one aspect of the present disclosure. The front view of FIG. 12A provides a full outline of the identified geology. FIG. 12B illustrates a side view of the 3D polygon 94 of the face 92 of FIG. 11B, in accordance with at least one aspect of the present disclosure. The side view of FIG. 12B provides insight into the geometry of the geology at the face 92. It can be appreciated that the 3D polygon 94 yields further insight in regard to the true form of the face 92 versus a 2D polygon that provides no third dimension for depth analysis.

Figure 13:
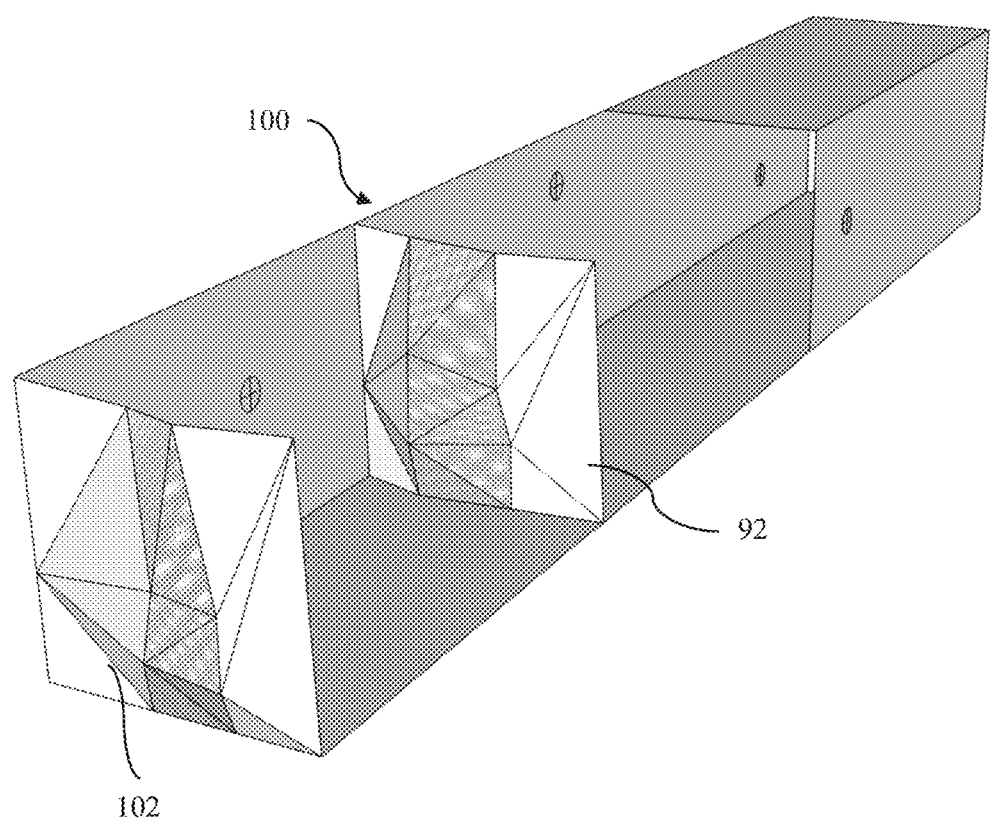
FIG. 13 illustrates another electronic/digital 3D mine model, in accordance with at least one aspect of the present disclosure.

FIG. 13 illustrates another electronic/digital 3D mine model 100 generated by the system 10, in accordance with at least one aspect of the present disclosure. The electronic/digital 3D mine model 100 is an update to the electronic/digital 3D mine model 90 of FIG. 10. A volume which was mined after the creation of the "first" face 92 is scanned to acquire subsequent range sensor data and/or is imaged to capture subsequent image data of the newly mined volume. Such image data may include, for example, 2D images of a "second" face and/or 2D images of additional survey control points. The subsequent range sensor data and the subsequent image data are utilized as explained above to generate an electronic/digital 3D mine model of the newly mined volume, and the localization module 50 may then be utilized to position the subsequent range sensor data and the resultant newly generated electronic/digital 3D mine model of the newly mined volume with respect to a previously generated electronic/digital 3D mine model. As shown in FIG. 13, the updated electronic/digital 3D mine model 100 includes a "second" face 102 and a fourth electronic/digital anchor. The inclusion of the newly added 3D geometric face 102 allows the spatial and geometric relationship to be built between the two faces 92, 102 to improve tracking of information such as the location, size, quality, etc. of the identified geology. FIG. 13 can be extended with any number of subsequent data collections to include further 3D geometric data representing the mine, 3D geometric data representing identified geology, and/or 3D electronic/digital anchors.

Figure 14:
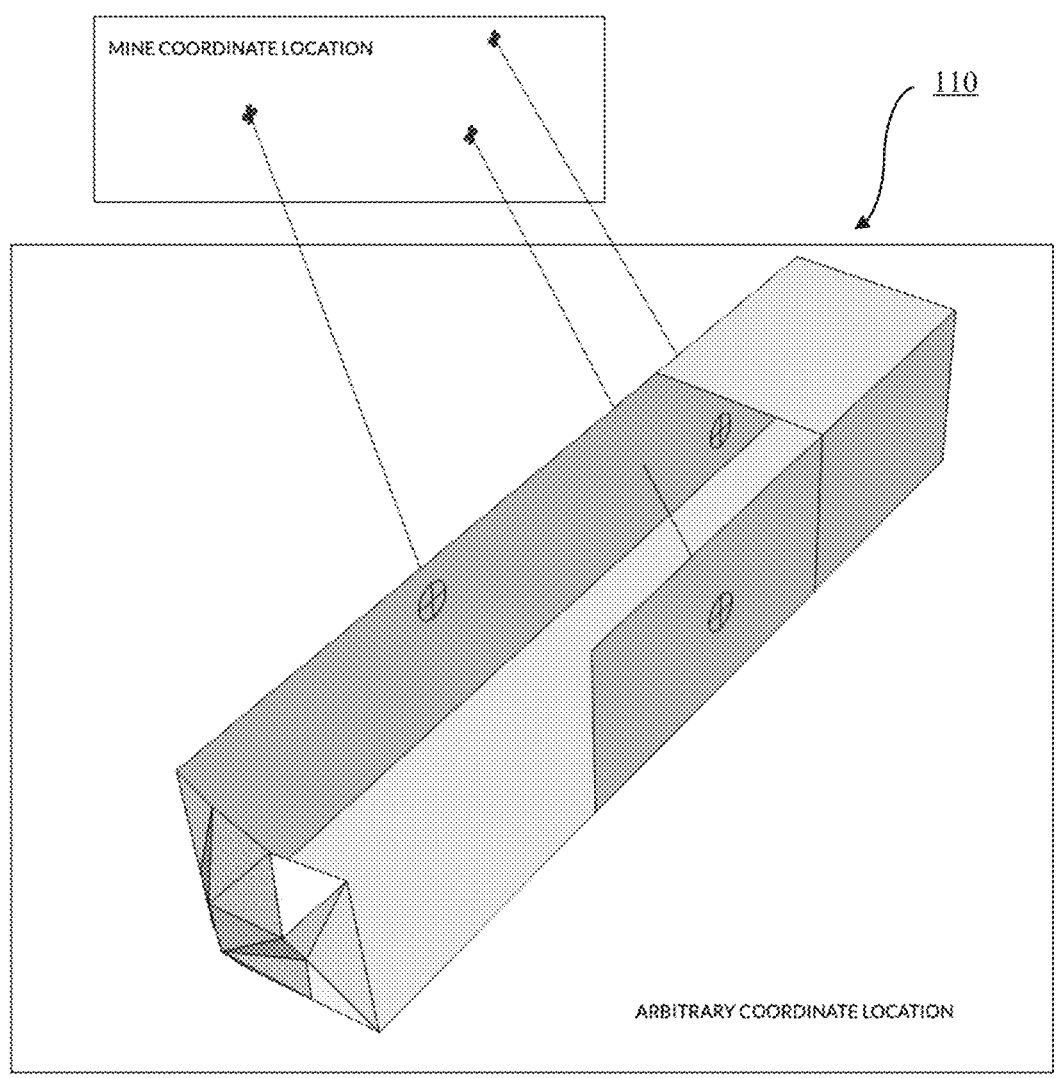
FIG. 14 illustrates another electronic/digital 3D mine model generated by the system 10, in accordance with at least one aspect of the present disclosure.

FIG. 14 illustrates another electronic/digital 3D mine model 110 generated by the system 10, in accordance with at least one aspect of the present disclosure. As shown in the "lower" portion of FIG. 14, the electronic/digital 3D mine model 110 includes 3D geometric information identifying geology and electronic/digital anchors (shown as circles with crosshairs). The "upper" portion of FIG. 14 illustrates the measured 3D survey control points (each shown as "+") of a mine coordinate system that are uploaded onto the system 10. The two separate portions of FIG. 14 highlight that the electronic/digital 3D mine model 110 differs in its arbitrary coordinate location from the 3D survey control points before use of the georeferencing module 48. The lines connecting the 3D survey control points and the 3D electronic/digital anchors represent the electronic/digital connection made between the two by the 3D survey control generator module 46.

Figure 15:
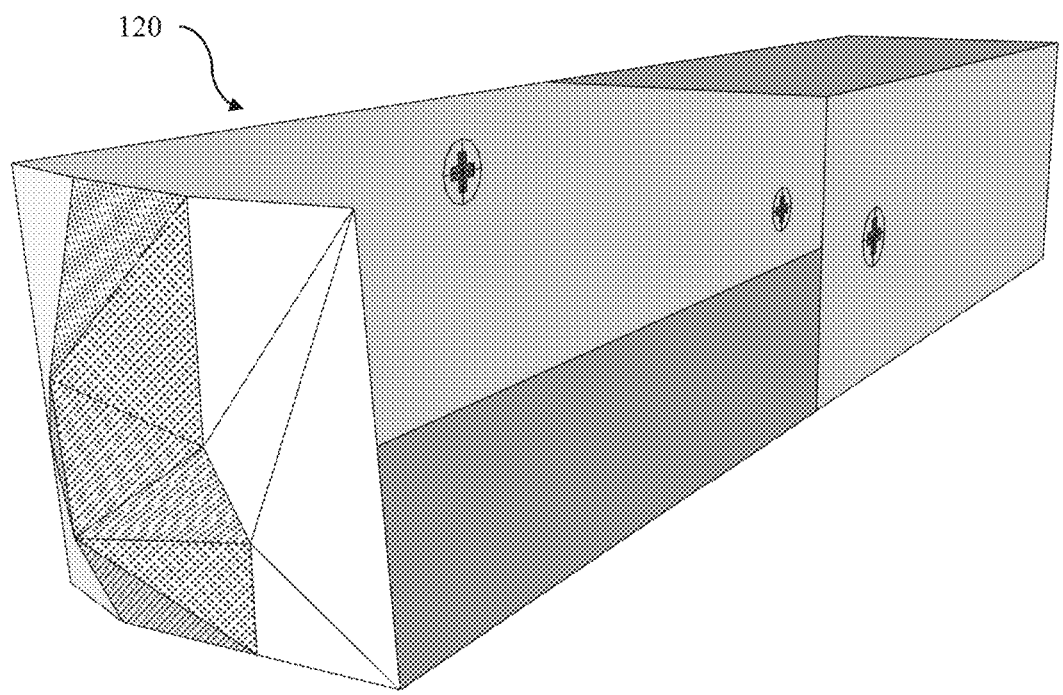
FIG. 15 illustrates a georeferenced, electronic/digital 3D mine model generated by the system 10, in accordance with at least one aspect of the present disclosure.

FIG. 15 illustrates a georeferenced, electronic/digital 3D mine model 120 generated by the system 10, in accordance with at least one aspect of the present disclosure. The 3D mine model 110 of FIG. 14 has been georeferenced by the georeferencing module 48 by spatially moving the 3D electronic/digital anchors of FIG. 14 to their corresponding 3D survey control point locations. The locational matching is shown in FIG. 15 by the 3D survey control points positioned inside the 3D electronic/digital anchors. The georeferenced 3D mine model 120 includes the 3D geometric representation of geology bearing area after the 3D data has been optimized to best match the surveyed control point locations.

Figure 16:
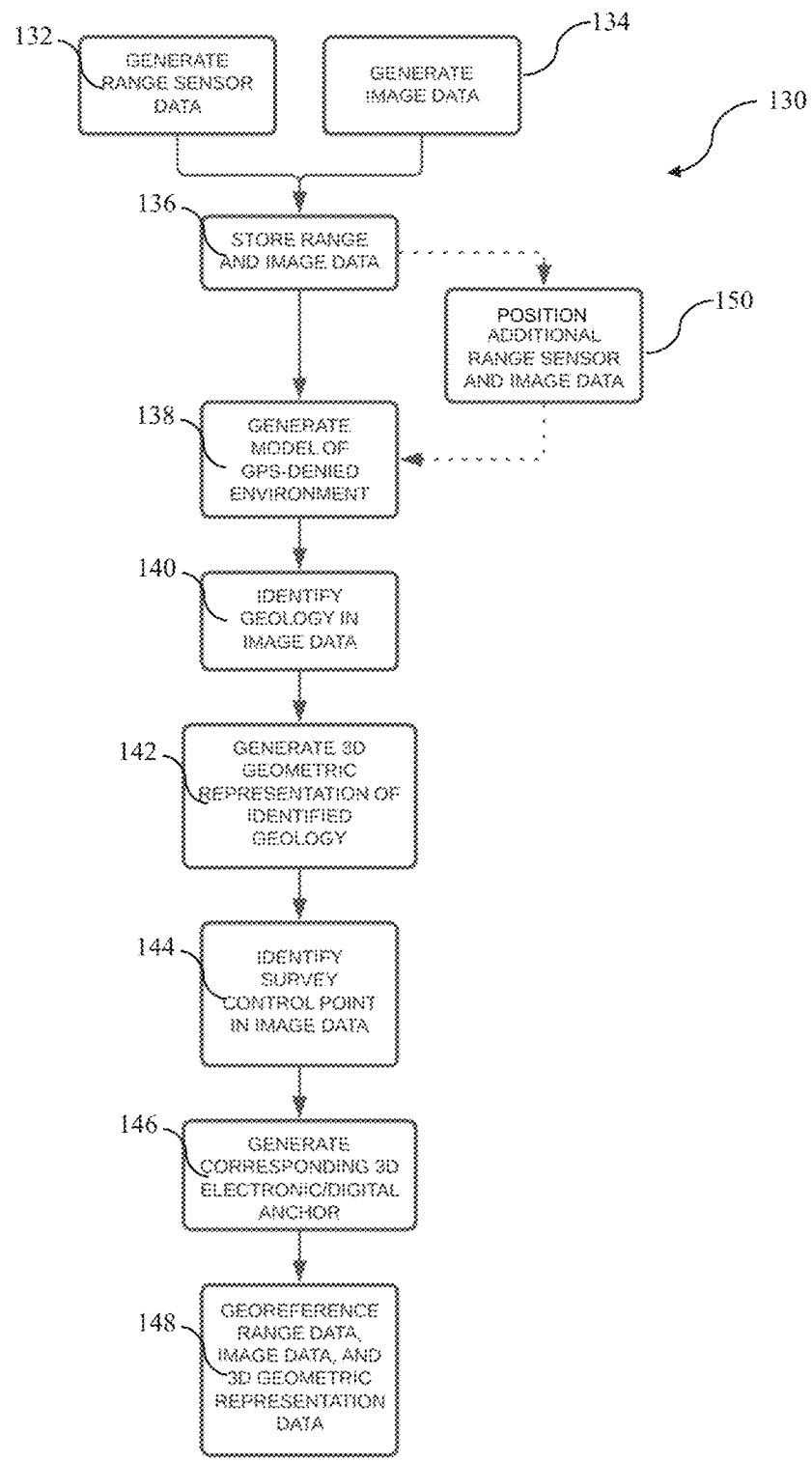
FIG. 16 illustrates a method for collecting and georeferencing 3D geometric data associated with a GPS-denied environment, in accordance with at least one aspect of the present disclosure.

FIG. 16 illustrates a method 130 for collecting and georeferencing 3D geometric data associated with a GPS-denied environment, in accordance with at least one aspect of the present disclosure. The method 130 may be implemented by the system 10. For purposes of simplicity, the 3D geometric data and the GPS-denied environment will be described hereinafter in the context of a mine, and the method 130 will be described in the context of being implemented by the system 10. However, it will be appreciated the GPS-denied environment may be something other than a mine and the method 130 may be implemented by something other than the system 10.

The method 130 includes utilizing the range sensor 22 to generate 132 range data representative of the mine and/or utilizing the camera 24 to generate 134 image data representative of the mine. The generated range data and image data can be stored in the memory circuit 28 of the apparatus 12 and communicated to the computing system 14. The generated range data and image data can then be stored 136 in the memory circuit 54 of the computing system 14.

The method 130 also includes utilizing the 3D generator module 42 to generate 138 an electronic/digital 3D model of the mine based on the range data and/or the image data. According to various aspects, the method 130 may also include utilizing the 3D generator module 42 to generate the above-described first and second calibrations to spatially locate image data (e.g., captured images) within the electronic/digital 3D model of the mine.

The method 130 additionally includes utilizing the ore segmentation module 44 to identify 140 geology in the image data to identify for delineation and zonation, and generate 142 3D geometric data representative of an identified geology. According to various aspects, the method 130 may also include utilizing the ore segmentation module 44 to assign a value to an identified geology, utilize the assigned value to convert the image data into a color space model, and generate a delineated zonation, or area, of identified geology within the image data.

The method 130 further includes utilizing the 3D survey control generator module 46 to identify 144 a survey control point in the image data, and generate 146 a 3D electronic/digital anchor corresponding to the identified survey control point. The method 130 may identify any number of survey control points in the image data, and thus may generate any number of 3D electronic/digital anchors. For a given identified survey control point, the method 130 includes matching a 3D electronic/digital anchor to its corresponding 3D survey control point coordinates, thereby creating an electronic/digital connection between the two.

The method 130 further includes utilizing the georeferencing module 48 to georeference 148 (i.e., spatially relocate) range data, image data and 3D geometric representation data to a real-world coordinate system of the mine. According to various aspects, the method 130 also includes utilizing the georeferenced range data, image data and 3D geometric representation data to georeference the generated electronic/digital 3D model of the mine with a real-world coordinate system of the mine.

As shown by the dashed lines in FIG. 16, the method 130 may further include utilizing the localization module 50 to position 150 additional, subsequently acquired range data and image data to generate an electronic/digital 3D model of the newly mined area, and align the electronic/digital 3D model of the newly mined area to a previous electronic/digital 3D model of the mine based on the additional range sensor data and image data acquired subsequent to the generation of the previous electronic/digital 3D model of the mine. The above-described actions 132-150 may be repeated any number of times, for any number of different areas of a mine, or for any number of different mines.

For the method 130 of FIG. 16, although the generating step 132 is shown as being performed concurrently with the generating step 134, it will be appreciated that the method 130 may include the generating step 132 and/or the generating step 134, and the generating steps 132, 134 can be performed sequentially or concurrently. Also, although the other steps of the method 130 are shown as being performed in a particular sequential order in FIG. 16, it will be appreciated that some of the steps can be performed in a different sequence (e.g., step 144 before step 140 or step 142) or concurrently.

EXAMPLES

Example 1—A system for collecting and georeferencing three-dimensional (3D) geometric data associated with a global positioning system (GPS)-denied environment is provided. The system comprises an apparatus couplable to a mobile platform, and a computing system communicably couplable with the apparatus. The apparatus comprises a processing circuit and at least one of the following: (1) a range sensor communicably couplable with the processing circuit and (2) a camera communicably couplable with the processing circuit. The computing system comprises a second processing circuit, a 3D generator module, a 3D survey control generator module and a georeferencing module. The 3D generator module is configured to generate a digital 3D model of the GPS-denied environment based on data acquired by at least one of the following: (1) the range sensor and (2) the camera. The 3D survey control generator module is configured to (1) identify a survey control point within the GPS-denied environment and (2) generate a 3D digital anchor within the 3D model of the GPS-denied environment, wherein the 3D digital anchor corresponds to the identified survey control point. The georeferencing module is configured to apply one or more non-rigid transformations to the digital 3D model of the GPS-denied environment. The second processing circuit is communicably couplable with the 3D generator module, the 3D survey control generator module and the georeferencing module.

Example 2—The system of Example 1, wherein the processing circuit of the apparatus is configured to time stamp at least one of the following: (1) data acquired by the range sensor and (2) an image captured by the camera.

Example 3—The system of Examples 1 or 2, wherein the apparatus further comprises a memory circuit communicably couplable with the processing circuit of the apparatus.

Example 4—The system of Examples 1, 2 or 3, wherein the apparatus further comprises a display device communicably couplable with the processing circuit of the apparatus.

Example 5—The system of Examples 1, 2, 3 or 4, wherein the apparatus further comprises at least one of the following: (1) a plurality of range sensors and (2) a plurality of cameras.

Example 6—The system of Examples 1, 2, 3, 4 or 5, wherein the 3D generator module is further configured to generate a set of calibrations to spatially locate captured images within the digital 3D model of the GPS-denied environment.

Example 7—The system of Examples 1, 2, 3, 4, 5 or 6, wherein the GPS-denied environment comprises one of the following: (1) a mine, (2) a tunnel, (3) a cave, (4) a bunker and (5) a conduit.

Example 8—The system of Examples 1, 2, 3, 4, 5, 6 or 7, wherein the georeferencing module is further configured to match the 3D digital anchor with an X, Y, Z coordinate location of the identified survey control point.

Example 9—The system of Examples 1, 2, 3, 4, 5, 6, 7 or 8, wherein the computing system further comprises an ore segmentation module communicably couplable with the second processing circuit and configured to identify a geology within the GPS-denied environment.

Example 10—The system of Example 9, wherein the ore segmentation model is further configured to convert at least a portion of a two-dimensional image associated with the GPS-denied environment into a color space.

Example 11—The system of Examples 9 or 10, wherein the ore segmentation module is further configured to generate a 3D geometric representation of the identified geology.

Example 12—The system of Examples 9, 10 or 11, wherein the ore segmentation module is further configured to generate a 3D polygon surrounding the identified geology.

Example 13—The system of Examples 1, 2, 3, 4, 5, 6, 7, 8, 9, 10, 11 or 12, wherein the computing system further comprises a localization module communicably couplable with the second processing circuit and configured to update the digital 3D model of the GPS-denied environment based on data acquired from at least one of the following: (1) the range sensor and (2) the camera.

Example 14—The system of Examples 1, 2, 3, 4, 5, 6, 7, 8, 9, 10, 11, 12 or 13, wherein the computing system further comprises a memory circuit communicably couplable with the second processing circuit.

Example 15—The system of Examples 1, 2, 3, 4, 5, 6, 7, 8, 9, 10, 11, 12, 13 or 14, wherein the computing system further comprises a display device communicably couplable with the second processing circuit.

Example 16—The system of Examples 1, 2, 3, 4, 5, 6, 7, 8, 9, 10, 11, 12, 13, 14 or 15, wherein the system further comprises the mobile platform.

Example 17—A method for collecting and georeferencing three-dimensional (3D) geometric data associated with a global positioning system (GPS)-denied environment is provided. The method comprises generating a digital 3D model of the GPS-denied environment based on range data and image data, identifying geology in the image data, generating 3D geometric data representative of the identified geology, identifying a survey control point in the image data, generating a 3D digital anchor corresponding to the identified survey control point, and georeferencing the range data, the image data and the 3D geometric representation data to a coordinate system of the GPS-denied environment.

Example 18—The method of Example 17, wherein generating the digital 3D model of the GPS-denied environment comprises spatially locating the image data within the digital 3D model of the GPS-denied environment.

Example 19—The method of Examples 17 or 18, further comprising matching the generated 3D digital anchor to an X, Y, Z coordinate location of the identified survey control point.

Example 20—The method of Examples 17, 18 or 19, further comprising acquiring additional range data and image data associated with the GPS-denied environment, positioning the acquired additional range data and image data, generating a second digital 3D model associated with the acquired additional range data and image data, and aligning the second generated digital 3D model associated with the acquired additional range data and image data with the generated digital 3D model of the GPS-denied environment to create an updated digital 3D model of the GPS-denied environment.

Although the various aspects of the system 10 (and its associated method) have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a mine, the general principles of the invention are equally applicable to other types of subterranean structures and/or GPS-denied environments.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system for georeferencing three-dimensional (3D) geometric data, the system comprising:
   an apparatus couplable to a mobile platform, the apparatus comprising:
   a processing circuit;
   a range sensor to acquire depth data of a subterranean, global positioning system (GPS)-denied environment, the range sensor communicably couplable with the processing circuit; and
   a camera to acquire imaging data of the subterranean, GPS-denied environment, the camera communicably couplable with the processing circuit; and
   a computing system communicably couplable with the apparatus, the computing system comprising:
   a second processing circuit;
   a 3D generator module communicably couplable with the second processing circuit and configured to generate a digital 3D model of the subterranean, GPS-denied environment based on the depth data;
   a 3D survey control generator module communicably couplable with the second processing circuit and configured to:
   identify, in the imaging data, a survey control point, wherein the survey control point comprises a visually-identifiable mark in the subterranean, GPS-denied environment captured by the camera, and wherein the survey control point has been associated with a coordinate location within a subterranean coordinate system; and
   generate a 3D digital anchor within the digital 3D model of the subterranean, GPS-denied environment, wherein the 3D digital anchor corresponds to the identified survey control point; and
   a georeferencing module communicably couplable with the second processing circuit and configured to apply one or more non-rigid transformations to the digital 3D model of the subterranean, GPS-denied environment to register the digital 3D model generated based on the depth data acquired by the range sensor to the subterranean coordinate system based on the coordinate location of the survey control point identified in the imaging data of the subterranean, GPS-denied environment captured by the camera.

2. The system of claim 1, wherein the processing circuit of the apparatus is configured to time stamp at least one of the following:
   data acquired by the range sensor; and
   an image captured by the camera.

3. The system of claim 1, wherein the apparatus further comprises a memory circuit communicably couplable with the processing circuit of the apparatus.

4. The system of claim 1, wherein the apparatus further comprises a display device communicably couplable with the processing circuit of the apparatus.

5. The system of claim 1, wherein the apparatus further comprises at least one of the following:
   a plurality of range sensors; and
   a plurality of cameras.

6. The system of claim 1, wherein the 3D generator module is further configured to generate a set of calibrations to spatially locate captured images within the digital 3D model of the subterranean, GPS-denied environment.

7. The system of claim 1, wherein the subterranean, GPS-denied environment comprises one of the following:
   a mine;
   a tunnel;
   a cave;
   a bunker; and
   a conduit.

8. The system of claim 1, wherein the georeferencing module is further configured to match the 3D digital anchor with an X, Y, Z coordinate location of the identified survey control point.

9. The system of claim 1, wherein the range sensor comprises a laser rangefinder, a radar module, an ultrasonic ranging module, a sonar module, a ranging module using triangulation, or a combination thereof.

10. The system of claim 1, wherein data acquired by the range sensor comprises a point cloud, a wireframe, a textured mesh, or a combination thereof.

11. The system of claim 1, further comprising projecting 2D images acquired by the camera onto the digital 3D model.

12. The system of claim 1, wherein the 3D generator module is to generate the digital 3D model of the subterranean, GPS-denied environment also based on the imaging data.

13. The system of claim 1, wherein the georeferencing module is to:
   spatially relocate the depth data to the subterranean coordinate system; and
   spatially relocate the imaging data to the subterranean coordinate system.

14. The system of claim 13, wherein the subterranean coordinate system comprises a real-world, geographic coordinate system.

15. A system for georeferencing three-dimensional (3D) geometric data, the system comprising:
   an apparatus couplable to a mobile platform, the apparatus comprising:
      a processing circuit;
      a range sensor to acquire depth data of a subterranean, global positioning system (GPS)-denied environment, the range sensor communicably couplable with the processing circuit; and
      a camera to acquire imaging data of the subterranean, GPS-denied environment, the camera communicably couplable with the processing circuit; and
   a computing system communicably couplable with the apparatus, the computing system comprising:
      a second processing circuit;
      a 3D generator module communicably couplable with the second processing circuit and configured to generate a digital 3D model of the subterranean, GPS-denied environment based on the depth data;
      a 3D survey control generator module communicably couplable with the second processing circuit and configured to:
         identify, in the imaging data, a survey control point within the subterranean, GPS-denied environment, wherein the survey control point comprises a visually-identifiable mark in the subterranean, GPS-denied environment captured by the camera, and wherein the survey control point has been associated with a coordinate location within a subterranean coordinate system; and
         generate a 3D digital anchor within the digital 3D model of the subterranean, GPS-denied environment, wherein the 3D digital anchor corresponds to the identified survey control point;
      a georeferencing module communicably couplable with the second processing circuit and configured to apply one or more non-rigid transformations to the digital 3D model of the subterranean, GPS-denied environment to register the digital 3D model generated based on the depth data acquired by the range sensor to the subterranean coordinate system based on the coordinate location of the survey control point identified in the imaging data of the subterranean, GPS-denied environment captured by the camera; and
      an ore segmentation module communicably couplable with the second processing circuit and configured to identify a geology within the subterranean, GPS-denied environment.

16. The system of claim 15, wherein the ore segmentation model is further configured to convert at least a portion of a two-dimensional image associated with the subterranean, GPS-denied environment into a color space.

17. The system of claim 15, wherein the ore segmentation module is further configured to generate a 3D geometric representation of the identified geology.

18. The system of claim 15, wherein the ore segmentation module is further configured to generate a 3D polygon surrounding the identified geology.

19. The system of claim 15, wherein the computing system further comprises a localization module communicably couplable with the second processing circuit and configured to update the digital 3D model of the subterranean, GPS-denied environment based on data acquired from at least one of the following:
   the range sensor; and
   the camera.

20. The system of claim 15, wherein the computing system further comprises a memory circuit communicably couplable with the second processing circuit.

21. The system of claim 15, wherein the computing system further comprises a display device communicably couplable with the second processing circuit.

22. The system of claim 15, further comprising the mobile platform.

23. A method for georeferencing three-dimensional (3D) geometric data, the method comprising:

generating a digital 3D model of a subterranean, global positioning system (GPS)-denied environment based on a range data acquired by a ranging sensor;

identifying geology in an image data acquired by an image sensor;

generating 3D geometric data representative of the identified geology;

identifying a survey control point in the image data, wherein the survey control point comprises a visually-identifiable mark in the subterranean, GPS-denied environment;

generating a 3D digital anchor corresponding to the identified survey control point; and applying one or more non-rigid transformations to the digital 3D model to georeference the 3D geometric data to a coordinate system of the subterranean, GPS-denied environment based on the coordinate location of the survey control point identified in the image data.

24. The method of claim 23, wherein generating the digital 3D model of the GPS-denied environment comprises spatially locating the image data within the digital 3D model of the subterranean, GPS-denied environment.

25. The method of claim 23, further comprising matching the generated 3D digital anchor to an X, Y, Z coordinate location of the identified survey control point.

26. The method of claim 23, further comprising:

acquiring additional range data and image data associated with the subterranean, GPS-denied environment;

positioning the acquired additional range data and image data;

generating a second digital 3D model of the subterranean, GPS-denied environment associated with the acquired additional range data and image data; and aligning the generated second digital 3D model of the subterranean, GPS-denied environment associated with the acquired additional range data and image data with the generated digital 3D model of the subterranean, GPS-denied environment to create an updated digital 3D model of the subterranean, GPS-denied environment.

* * * * *